United States Patent
Ha et al.

(10) Patent No.: US 11,409,806 B2
(45) Date of Patent: Aug. 9, 2022

(54) APPARATUS AND METHOD FOR CONSTRUCTING AHO-CORASICK AUTOMATA FOR DETECTING REGULAR EXPRESSION PATTERN

(71) Applicant: SOMANSA CO., LTD., Seoul (KR)

(72) Inventors: Byung Hyun Ha, Seoul (KR); Tae Wan Kim, Seoul (KR); Il Hoon Choi, Seoul (KR)

(73) Assignee: SOMANSA CO., LTD., Seoul (KR)

( * ) Notice: Subject to any disclaimer, the term of this patent is extended or adjusted under 35 U.S.C. 154(b) by 3 days.

(21) Appl. No.: 17/134,624

(22) Filed: Dec. 28, 2020

(65) Prior Publication Data
US 2022/0179913 A1    Jun. 9, 2022

(30) Foreign Application Priority Data
Dec. 4, 2020 (KR) ........................ 10-2020-0168282

(51) Int. Cl.
*G06F 16/903* (2019.01)
*G06F 16/901* (2019.01)

(52) U.S. Cl.
CPC .... *G06F 16/90344* (2019.01); *G06F 16/9027* (2019.01)

(58) Field of Classification Search
CPC ................ G06F 16/90344; G06F 16/9027
See application file for complete search history.

(56) References Cited

U.S. PATENT DOCUMENTS 7,634,500 B1 * 12/2009 Raj ................... G06F 16/90344
                                                                        365/49.1
2006/0020595 A1 * 1/2006 Norton .............. G06F 16/90344
(Continued)

FOREIGN PATENT DOCUMENTS

KR           10-1382787 B1      4/2014
KR      10-2016-0093101 A       8/2016

OTHER PUBLICATIONS

Alfred V. Aho and Margaret J. Corasick, "Efficient String Matching: An Aid to Bibliographic Search" pp. 333-340 (Year: 1975).*
(Continued)

*Primary Examiner* — Mark D Featherstone
*Assistant Examiner* — Kweku William Halm
(74) *Attorney, Agent, or Firm* — Harness, Dickey & Pierce, P.L.C.

(57) ABSTRACT

An apparatus for constructing Aho-Corasick automata according to the present invention includes a concatenative normal form transforming unit configured to receive a regular expression that is expressed using an operator including a concatenation and an alternation and transform the regular expression into concatenative normal forms (wherein each concatenative normal form is defined as a form in which character alternations are connected by concatenation); a trie generating unit configured to generate a trie from the concatenative normal forms by updating states and transitions of the trie (wherein each transition corresponds to a set of characters) while processing each concatenative normal form in order; and a failure link creating unit configured to create a failure link for each state of the trie by using a set of characters corresponding to each transition of the trie.

14 Claims, 21 Drawing Sheets

(56) References Cited

U.S. PATENT DOCUMENTS

| | | | | |
|---|---|---|---|---|
| 2007/0282835 A1* | 12/2007 | Duxbury | ............. | G06F 16/9024 |
| 2008/0208850 A1* | 8/2008 | Boyce | ............... | G06F 16/90344 |
| 2010/0199348 A1* | 8/2010 | Sahni | ................. | H04L 63/1416 |
| | | | | 726/23 |
| 2011/0185077 A1* | 7/2011 | Bremler-Barr | ...... | H03M 7/3086 |
| | | | | 709/231 |
| 2012/0221494 A1* | 8/2012 | Pasetto | .................... | G06N 5/00 |
| | | | | 706/12 |
| 2015/0025980 A1* | 1/2015 | Zaretsky | ............ | G06Q 30/0275 |
| | | | | 705/14.71 |
| 2017/0277811 A1* | 9/2017 | Mistry | ............... | G06F 16/9027 |

OTHER PUBLICATIONS

Ali et al., "Approximate Multiple Pattern String Matching using Bit Parallelism: A Review" International Journal of Computer Applications (0975-8887) pp. 47-51 vol. 74—No. 19, Jul. 2013 (Year: 2013).*

Marschall et al, Probabilistic Arithmetic Automata and Their Applications, vol. 9, No. 6 pp. 1737-1750 (Year: 2012).*

Mukherjee et al., "Search and Retrieval of Compressed Text" pp. 207-262 (Year: 2005).*

Office Action from corresponding Korean Patent Application No. 10-2020-0168282, dated Jan. 25, 2021.

* cited by examiner

```
procedure HandleConcat(cnode, i, cnf, report):
    if i < cnode.children.size():
        HandleAltern(cnode.children[i], cnf, function (cnf) {
            HandleConcat(i + 1, cnf, report)
        })
    else:
        report(cnf)

procedure HandleAltern(anode, cnf, report):
    if anode.children are all symbol nodes:
        let symalt := generated SymAlt from anode.children
        cnf.push_back(symalt)
        report(cnf)
        cnf.pop_back()
    else:
        for each child in children:
            HandleConcat(child, 0, cnf, report)
```

FIG. 9

```
function Duplicate(s)

T' = [ <C, d> for <C, d> ∈ s.T ]

O' = [ o for o ∈ s.O ]

return <T', O', nil>
```

FIG. 13

```
function BuildTrie(s, cnf, i):
    if i = length of cnf:
        s := Duplicate(s)
        Add output data to s.O
        return s let T' := {}  // newly created transitions
    let Li := cnf[i]

for each Transition t in s.T:
        if Li ∩ t.C = ∅:
            continue s := Duplicate(s)

if Li = t.C:
            t.d := BuildTrie(t.d, cnf, i + 1)
            Li := nil
            break else if t.C ⊂ Li:
            t.d := BuildTrie(t.d, cnf, i + 1)
            Update Li to Li \ t.C else if Li ⊂ t.C:
            Update t.C to t.C \ Li
            let d' := BuildTrie(t.d, cnf, i + 1)
            Add <Li, d'> to T'
            Li := nil
          break else:
            Update t.C to t.C \ Li
            let d' := BuildTrie(t.d, cnf, i + 1)
            Add <Li ∩ t.C, d'> to T'
            Update Li to Li \ t.C if Li ≠ nil:
        s := Duplicate(s)
        let d' := BuildTrie(<{}, {}, nil>, cnf, i + 1)
        Add <Li, d'> to T'

Add all T' to s.T return s
```

FIG. 14

```
function Duplicate(s):
    T' = [ <c, d> for <c, d> ∈ s.T ]
    O' = [ o for o ∈ s.O ]
    return <T', O', nil>
```
FIG. 15
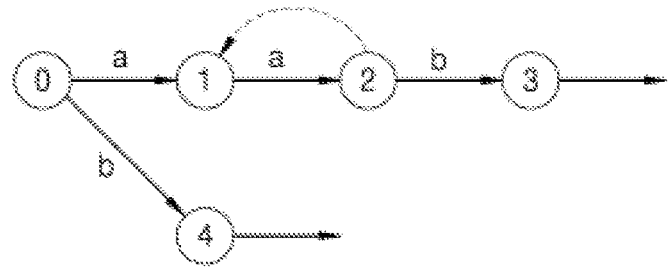
FIG. 16A
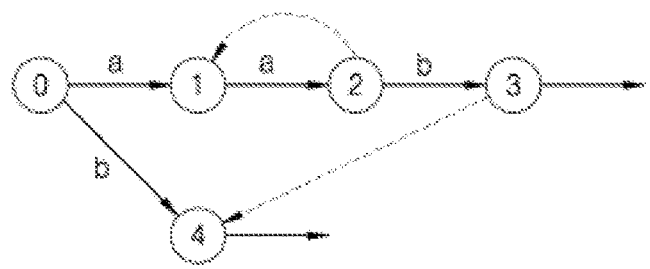
FIG. 16B

```
procedure LinkFailure(root):
    let R := {} for each Transition t in root.T:
        t.d.f := root
        Add t.d to R while R is not empty:
        let R' := {} for each State r in R:
            T' := {} for i := 0, ..., length of r.T - 1:    -- (rLoop)
                let C := r.T[i].C
                let s := r.T[i].d let p := r.f
                while p ≠ nil:
                    for each Transition <B, q> in p.T:
                        if C ⊆ B:
                            r.T[i] := RefineTrans(C, s, q, R')
                            continue rLoop
                        else if B ∩ C ≠ ∅:

let t' := RefineTrans(B ∩ C, s, q, R')
                            Add t' to T'
                            Update C to C \ B
                    p := p.f r.T[i] := RefineTrans(C, s, root, R')

Add all T' to r.T

```
function RefineTrans(A, s, f, R'):
    let d := Duplicate(s)
    Add all f.O to d.O
    d.f := f Add d to R' return <A, d>
```

APPARATUS AND METHOD FOR CONSTRUCTING AHO-CORASICK AUTOMATA FOR DETECTING REGULAR EXPRESSION PATTERN

CROSS-REFERENCE TO RELATED APPLICATION

This application claims the benefit under 35 USC § 119(a) of Korean Patent Application No. 10-2020-0168282, filed on Dec. 4, 2020, in the Korean Intellectual Property Office, the entire disclosure of which is incorporated herein by reference for all purposes.

FIELD

The following description relates to an apparatus and method for constructing Aho-Corasick automata for detecting a character string pattern given as a regular expression in a document to be searched.

BACKGROUND

A regular expression is a standard way of expressing a set of character strings having specific rules, and is widely used in search and replacement of character strings. A regular expression basically defines a set of character strings to be searched for using various operators, such as concatenation, alternation, and Kleene Star. Based on the regular expression, data type determination, validation, information extraction, data conversion, vocabulary and syntax analysis, and the like are performed, and the regular expression is utilized in various fields, such as text processing, programming language processing, network packet analysis and intrusion detection, DNA sequence analysis, and so on.

The most basic way to detect a specific string pattern in a target document is to search for a single string of characters. In an effort to facilitate the search, the Rabin-Karp algorithm, the Knuth-Morris-Pratt algorithm, the Boyer-Moore algorithm, and the like have been developed. However, in order to detect the string pattern given as a regular expression in this way, the target document must be read repeatedly for each of a plurality of strings represented by the regular expressions, which is not efficient.

There are mainly two methods to detect a set of strings of characters rather than a single string of characters. The first method is to receive and detect each of the strings to be searched. This method includes the Aho-Corasick algorithm, the Commentz-Walter algorithm, and the Wu-Manber algorithm. The second method is to receive a regular expression pattern and detect a character string that matches the regular expression pattern. This method basically transforms regular expressions into non-deterministic finite automata (NFAs) or deterministic finite automata (DFAs) to search for a character string.

The Aho-Corasick algorithm is an algorithm which receives multiple input character strings to be searched for, constructs automata, and quickly finds a given character string in a target document by using the automata. The Aho-Corasick algorithm can search all character strings, including overlapping character strings, while reading input characters from the target document only once.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Basically, construction of Aho-Corasick automata for character string search consists of two steps: (i) generating a trie from a given set of character strings, and (ii) connecting failure links. However, in order to receive a set of character strings given as a regular expression, rather than a set of character strings consisting of individual character strings, and process the received set of character strings more efficiently, the following aspects need to be considered.

First, a regular expression must be transformed so that it can be input to an Aho-Corasick algorithm. The simplest way to do so is to create and use a set of all possible character strings from the regular expression. However, this method cannot avoid lengthening of the processing time when the number of created character strings is very large. Thus, there is a need for a method capable of processing the character strings in a short time by using a special format that can express a set of character strings, rather than individual character strings.

Second, a trie used in the Aho-Corasick algorithm basically uses one transition per matchable input character. In this case, trie generation and processing of failure link connection are not complicated, but a very large storage space is required when the set of character strings to be searched is large. Hence, there is a need for a method capable of reducing the number of transitions used.

Third, in a general Aho-Corasick algorithm, a trie in the form of a tree is used. Due to the nature of the algorithm, a large number of subtrees representing the same information are generated, resulting in a significant waste of storage space. Therefore, it is required to use a trie in the form that can express the same subtree without duplication.

Accordingly, an object to be achieved by the present invention is to provide an apparatus and method for constructing Aho-Corasick automata which can receive a pattern given as a regular expression, process the regular expression in a faster time, and save storage space by reducing the number of transitions.

In one general aspect of the present invention, an apparatus for constructing Aho-Corasick automata includes a concatenative normal form transforming unit configured to receive a regular expression that is expressed using an operator including a concatenation and an alternation and transform the regular expression into concatenative normal forms (wherein each concatenative normal form is defined as a form in which character alternations are connected by concatenation); a trie generating unit configured to generate a trie from the concatenative normal forms by updating states and transitions of the trie (wherein each transition corresponds to a character set) while processing each concatenative normal form in order; and a failure link creating unit configured to create a failure link for each state of the trie by using a character set corresponding to each transition of the trie.

In another general aspect of the present invention, a method of constructing Aho-Corasick automata includes: receiving a regular expression that is expressed using an operator including a concatenation and an alternation and transforming the regular expression into concatenative normal forms (wherein each concatenative normal form is defined as a form in which character alternations are connected by concatenation); generating a trie from the concatenative normal forms by updating states and transitions of the trie (wherein each transition corresponds to a character set) while processing each concatenative normal form in order; and creating a failure link for each state of the trie by using a character set corresponding to each transition of the trie.

Other features and aspects will be apparent from the following detailed description, the drawings, and the claims.

BRIEF DESCRIPTION OF THE DRAWINGS

FIG. 9 shows pseudo-codes of the HandleConcat function and the HandleAltern function.

FIGS. 12 and 13 show flowcharts of a buildtrie function and a duplicate function for generating a trie from a set of combined standard types, respectively.

FIGS. 14 and 15 show pseudo-codes of the buildtrie function and the duplicate function, respectively.

FIGS. 16A and 16B show examples of a process of generating a failure link by a general Aho-Corasick algorithm.

FIGS. 20 and 21 show pseudo-codes of the LinkFailure function and the RefineTrans function, respectively.

FIG. 22 shows an example of a trie generated from combined standard types according to an embodiment of the present invention.

Figure 1:
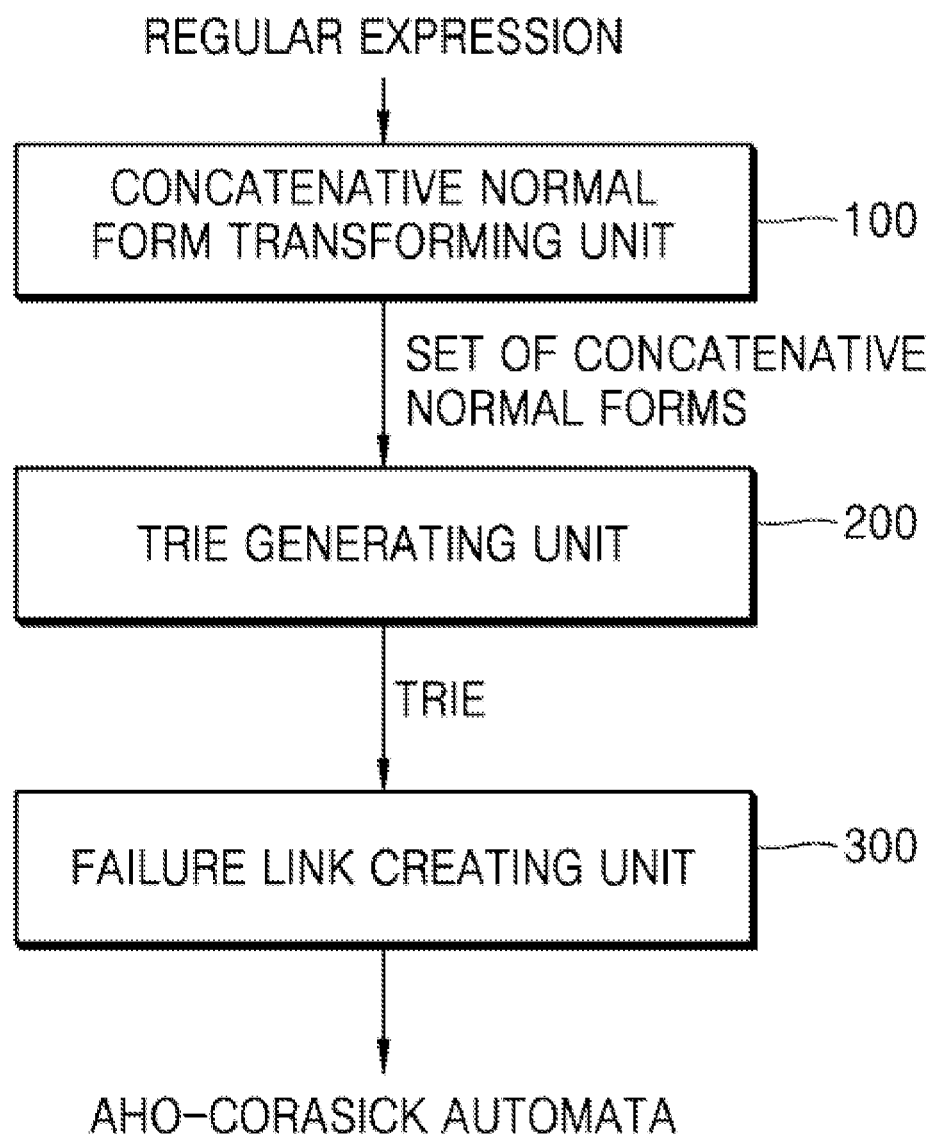
FIG. 1 is a block diagram illustrating an apparatus for constructing Aho-Corasick automata according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In this specification, the term "character" includes not only a typical character in a natural language, but also a series of symbols, such as binary data consisting of bits, such as the contents of a network packet, and a DNA sequence represented by four symbols.

FIG. 1 is a block diagram illustrating an apparatus for constructing Aho-Corasick automata according to an embodiment of the present invention. An apparatus for constructing Aho-Corasick automata according to the present embodiment includes a concatenative normal form transforming unit 100, a trie generating unit 200, and a failure link creating unit 300.

The concatenative normal form transforming unit 100 receives a regular expression expressed by using an operator including concatenation and an alternation to search a set of strings of characters. The concatenation normal form transforming unit 100 transforms an input regular expression into a set of so-called concatenative normal forms. Here, the concatenation normal form is a special form of a regular expression, and is defined as a form in which character alternations are connected by concatenation.

For example, let the following regular expression be given. In the present specification, a regular expression will be bracketed by / / symbols.

/([abc]|b[abc]){1,2}/

When the above regular expression is transformed into concatenative normal form, the following six concatenative normal forms are obtained.

/[abc]/

/[b][abc]/

/[abc][abc]/

/[abc][b][abc]/

/[b][abc][abc]/

/[b][abc][b][abc]/

Each character alternation constituting a concatenative normal form expression refers to a set of characters that can be placed in individual positions in the character string represented by the concatenative normal form expression. For example, /[b][abc]/ in the concatenative normal forms presented above represents a set of character strings {ba, bb, bc}. That is, the first position in each character string can be only b, and the second position can be a, b, or c. For reference, when concatenative normal forms transformed from a given regular expression are connected by alternation, the resulting expression represents the same set of character strings as the regular expression. However, a regular expression with a Kleene star cannot be transformed into a finite set of concatenative normal forms. Therefore, it is necessary to perform transformation into concatenative normal form after replacing the Kleene star with a quantification with a finite number of iterations.

The trie generating unit 200 generates a trie from a set of concatenative normal forms output from the concatenative normal form transforming unit 100. At this time, the trie generating unit 200 updates a state (i.e., a state node) and a transition of the trie while sequentially processing each concatenative normal form included in the set of the concatenative normal forms. Here, each transition of the generated trie corresponds not to an individual character, but to a character set consisting of one or more characters.

The failure link creating unit 300 generates a failure link for each state of the trie from the trie generating unit 200. At this time, the failure link creating unit 300 generates a failure link using a character set corresponding to each transition of the trie. The Aho-Corasick automaton according to the present invention is output from the failure link creating unit 300.

The trie generating unit 200 and the failure link creating unit 300 generate the transition and the failure link using a character set rather than an individual character. Therefore, in the Aho-Corasick automata according to the present invention, one transition processes a character set, rather than one character. The characters constituting the character set are characters constituting the alternation of the concatenative normal form.

For example, let the following regular expression be given.

/[ab][ab]|d[ac]/

The regular expression above represents the following set of character strings.

{aa,ab,ba,bb,da,dc}

Figure 2:
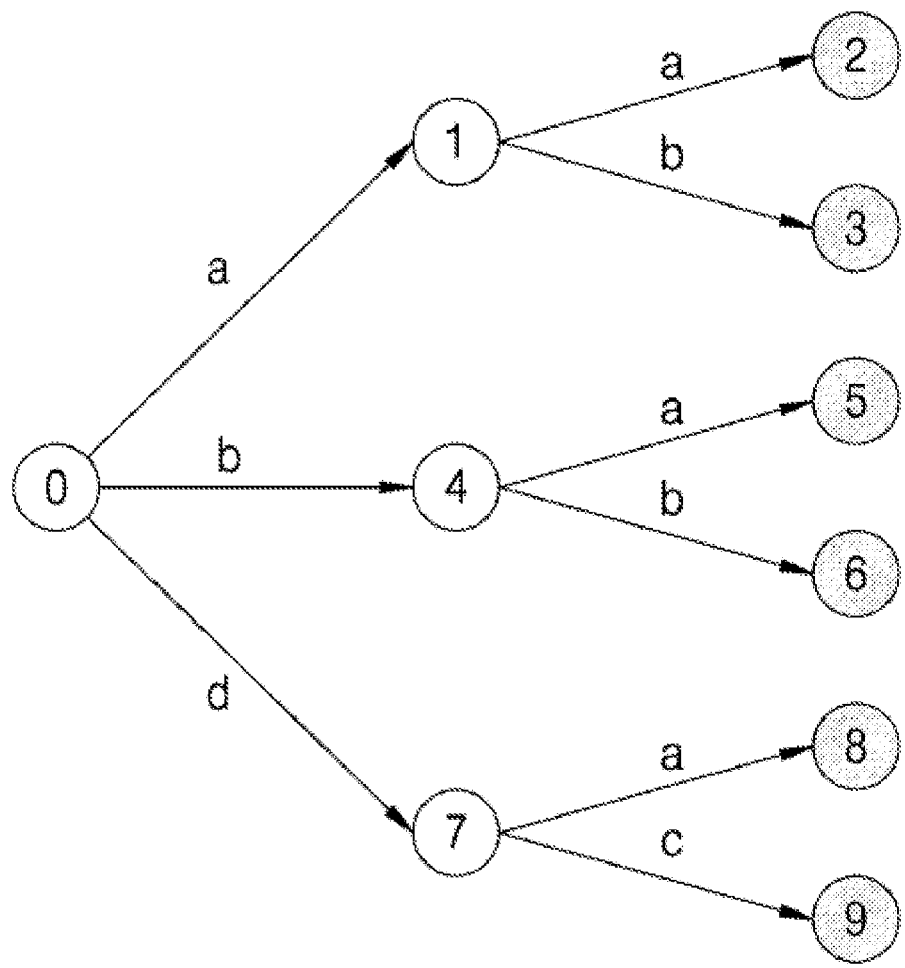
FIGS. 2 and 3 show a trie generated by a general Aho-Corasick algorithm and an Aho-Corasick automaton, which is the final result of connecting failure links from the trie, respectively.
Figure 3:
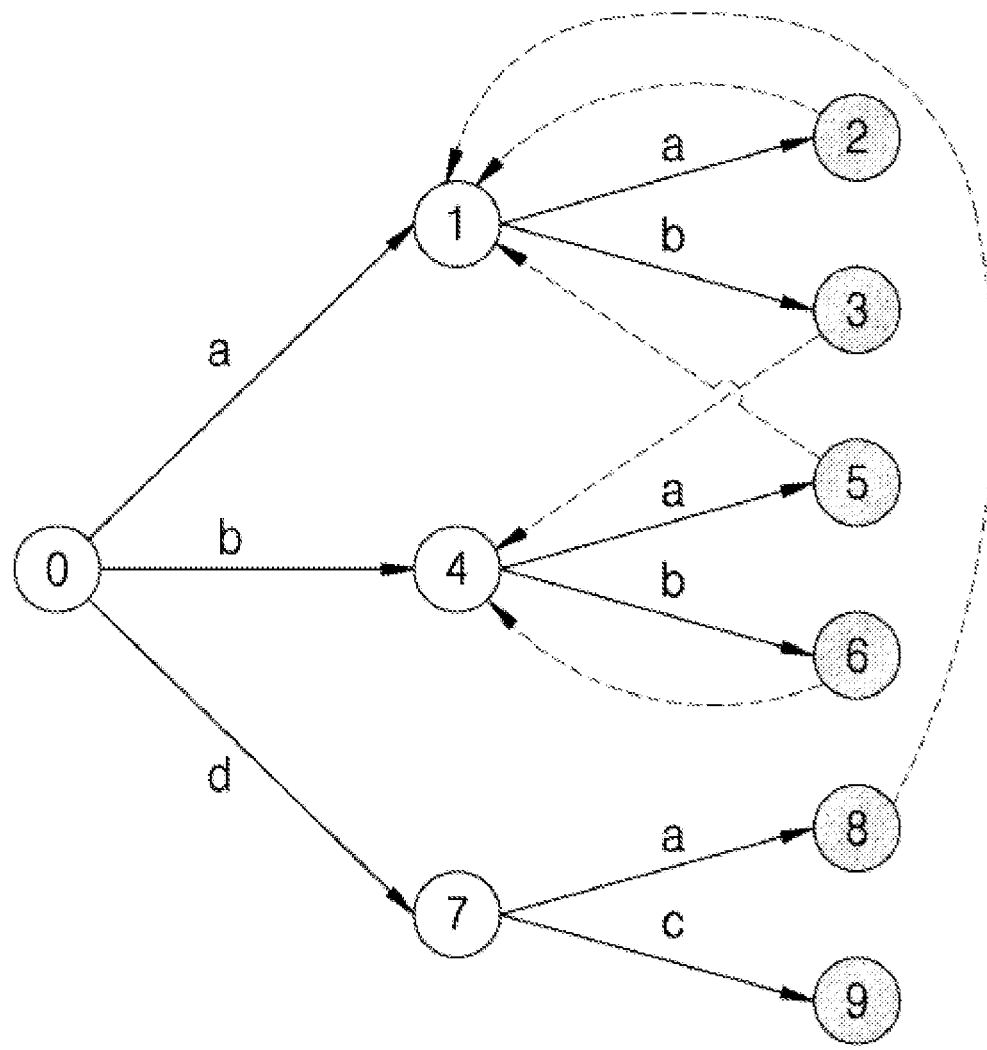

In order to assist in understanding the present invention, a trie generated by a general Aho-Corasick algorithm using the above set of character strings as an input and a final result of connecting a failure link therefrom are shown in FIGS. 2 and 3.

In FIGS. 2 and 3, a circle represents a state, and a solid arrow represents a transition. The number presented on the state indicates a state identifier, and a character above the solid arrow indicates a character processed by the corresponding transition. For example, in state 1, if the next input character of a document to be searched is a, the automaton proceeds to state 2. A dotted arrow is a failure link, indicating a target state of the failure link. For example, if there is no transition in state 2 to process the next input character, the automaton returns to state 1 to check whether the input character can be processed. A target state of a failure link of a state without a dotted arrow is a root state with an identifier of 0. A state in which a detected character string is present is shown in gray, and may additionally have additional information (output) such as the length of the detected character string.

The regular expression given above may be transformed into concatenative normal forms according to an embodiment of the present invention, as shown below.

/[ab][ab]/

/[d][ac]/

Figure 4:
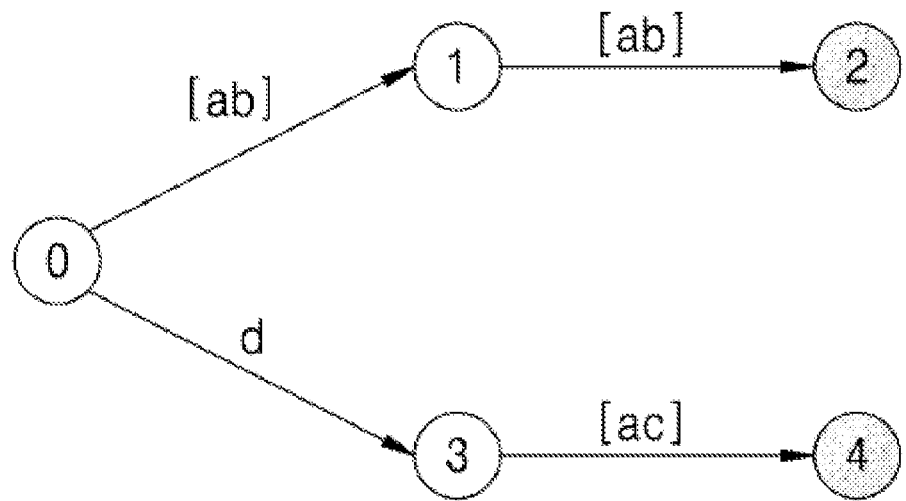
FIG. 4 shows a trie generated from concatenative normal forms according to an embodiment of the present invention.
Figure 5:
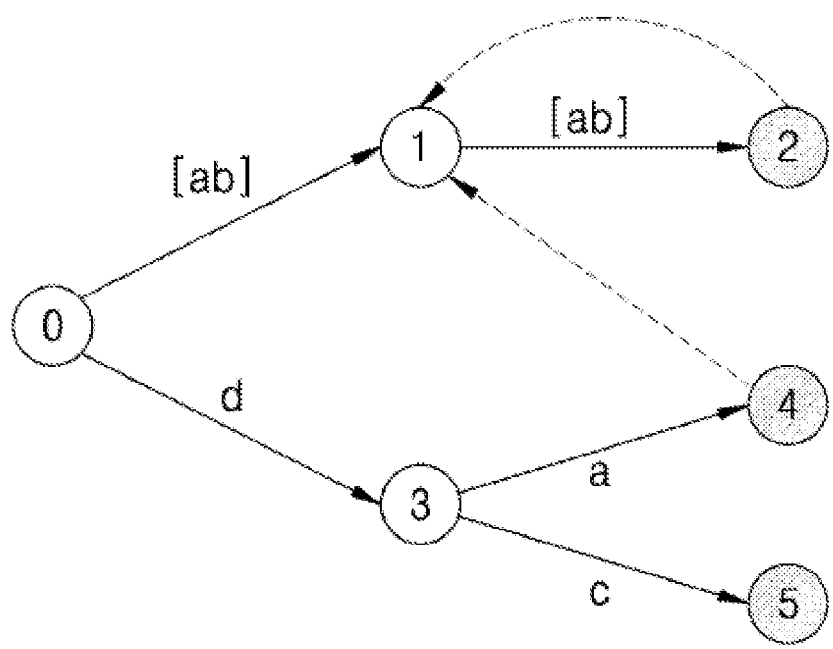
FIG. 5 shows an Aho-Corasick automaton obtained by generating failure links in the trie of FIG. 4 according to an embodiment of the present invention.

FIG. 4 shows a trie generated from the above concatenative normal forms, and FIG. 5 shows an Aho-Corasick automaton obtained by generating a failure link in the trie of FIG. 4. Referring to FIG. 5, a transition from state 0 to state 1 processes an alternation (or a set of characters) [ab], and a transition from state 1 to state 2 processes an alternation [ab]. For example, if the next input character of a document to be searched is a or b in state 0, the automaton proceeds to state 1, and if, in state 1, the next input character of the document to be searched is "a" or "b," the automaton proceeds to state 2, and a character string is detected. When the next input character comes in state 2, the automaton returns to state 1 along the failure link and checks whether the input character can be processed (i.e, whether the input character is a or b).

The automaton of FIG. 3 according to a general Aho-Corasick algorithm has 10 states and 9 transitions. It can be seen that the automaton of FIG. 5 according to the embodiment of the present invention has 6 states and 5 transitions, and thus its size is significantly reduced.

The process of transforming the regular expression into a set of concatenative normal forms by the concatenative normal form transforming unit 100 will be described in more detail below.

Figure 6:
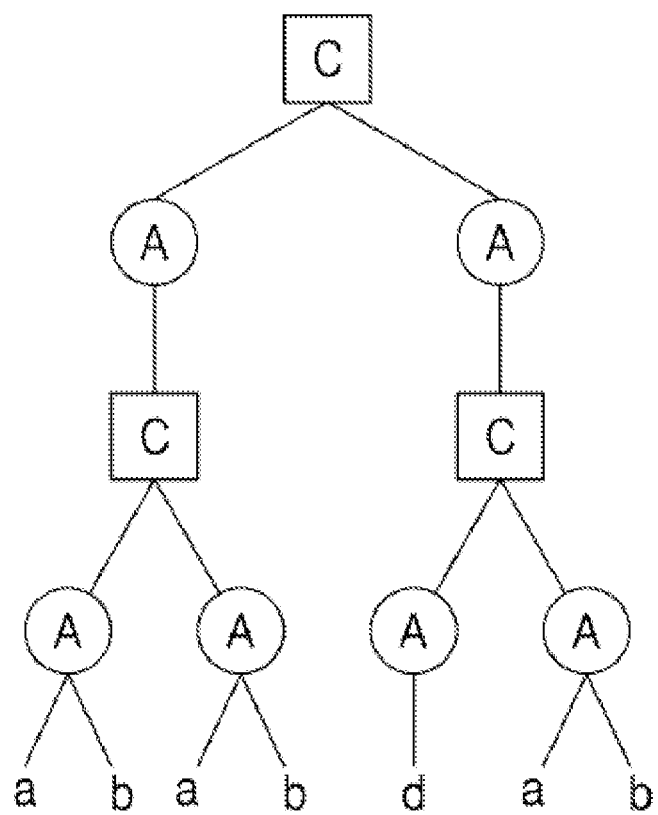
FIG. 6 shows an example of a parse tree of a regular expression.

In order to transform a regular expression into concatenative normal forms, a parse tree is first created through a syntax analysis or parsing procedure. The parse tree is composed of concatenation, alternation, and character nodes, and a root is a concatenation node. Each concatenation node has an alternation node as a child, and the alternation node has child nodes which are all concatenation nodes or text nodes. For example, the parse tree of a regular expression /[ab][ab]|d[ac]/ is shown in FIG. 6. Here, C represents a concatenation node and A represents an alternation node. Since the syntax analysis process can be performed using a known technique, a detailed description thereof will be omitted.

A specific method of transforming the given regular expression R into concatenative normal forms is as follows. First, a parse tree of the regular expression R is constructed using Parse, which is a syntax analysis function, and then HandleConcat is called with a root node rnode of the parse tree. Here, Report is a function that records the concatenative normal form. This is expressed in pseudo-code as shown below.

let rnode:=Parse(R)

HandleConcat(rnode,0,[ ],Report)

Figure 7:
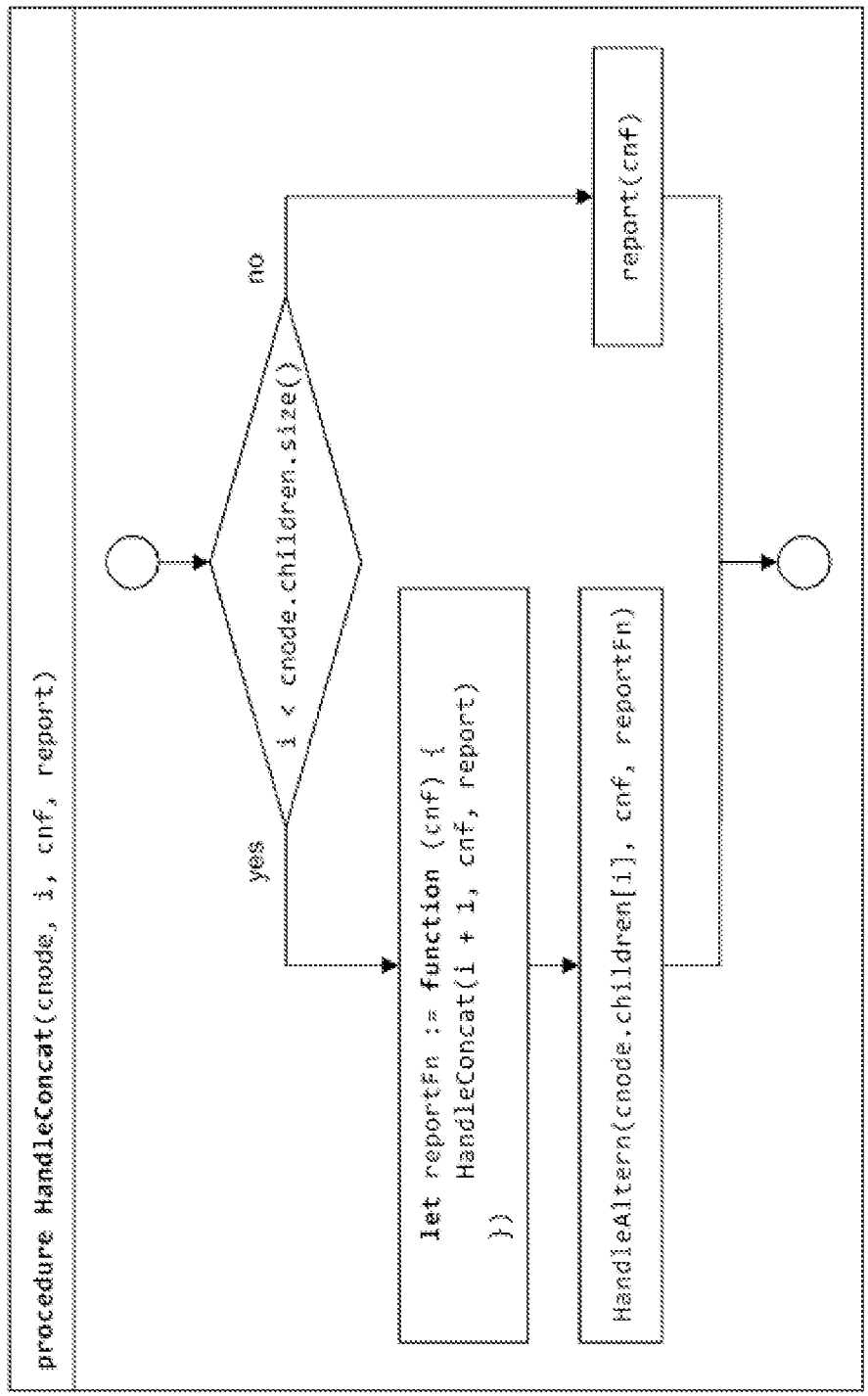
FIGS. 7 and 8 show flowcharts of a HandleConcat function and a HandleAltern function for transforming a regular expression into concatenative normal forms, respectively.
Figure 8:
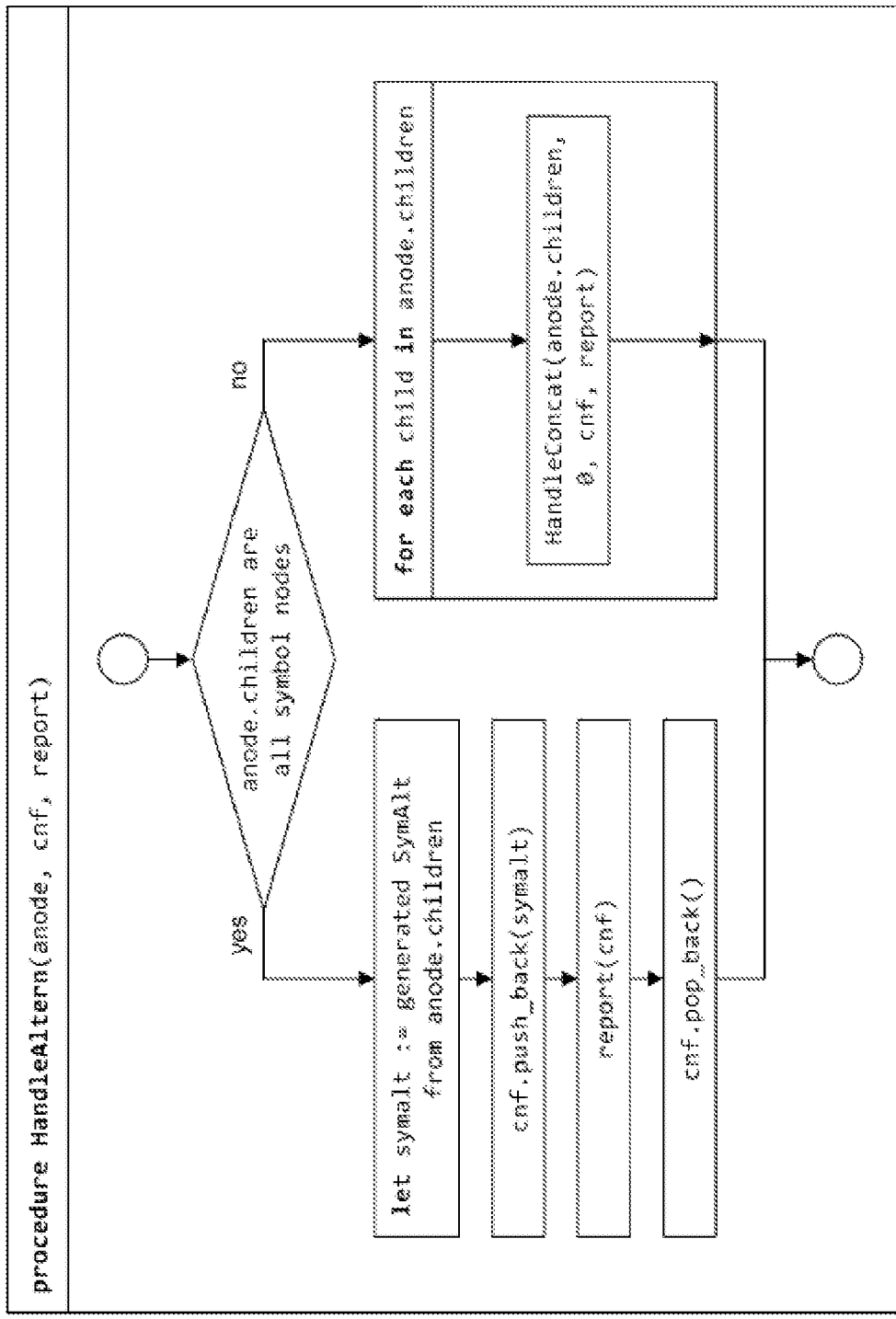

FIGS. 7 and 8 show flowcharts of a HandleConcat function and a HandleAltern function for transforming a regular expression into concatenative normal forms, respectively, and FIG. 9 shows pseudo-codes of the HandleConcat function and the HandleAltern function.

HandleConcat processes a concatenation node and HandleAltern processes an alternation node. cnf represents a concatenative normal form being generated, and SymAlt represents a symbol alternation that comes in each position of the concatenative normal form. A quantifier can be processed by converting it into concatenation and alternation, or can be easily implemented using a stack, and hence a detailed processing method will be omitted.

The process of generating a trie from a set of concatenative normal forms by the trie generating unit 200 will be described in more detail as below.

Figure 10A:
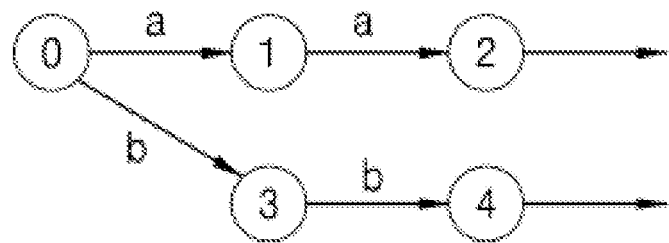
FIGS. 10A and 10B show examples of a process of constructing a trie by a general Aho-Corasick algorithm.
Figure 10B:
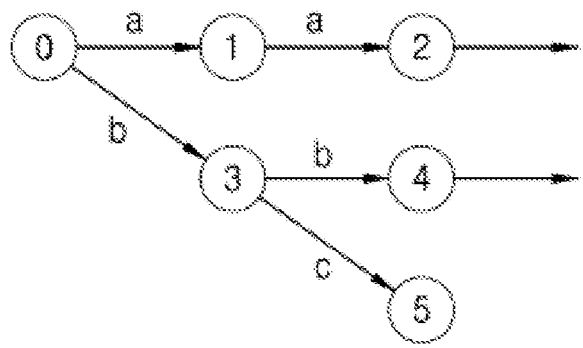

To assist in understanding the present invention, examples of a process of generating a trie by a general Aho-Corasick algorithm are shown in FIGS. 10A and 10B. In a general Aho-Corasick algorithm, a trie is constructed by adding transition and state nodes for each character of an input character string. For example, in a state in which a trie as shown in FIG. 10A is constructed, processing an input character string be results in a trie as shown in FIG. 10B. For the input character string, only one (at most) transition is added to each state of the trie.

The trie generating unit 200 according to an embodiment of the present invention generates a trie by using the concatenative normal forms as input, and the process of processing one concatenative normal form is a process of updating the states and transitions of the trie by applying the alternation included in the concatenative normal form to the previously generated trie.

Figure 11A:
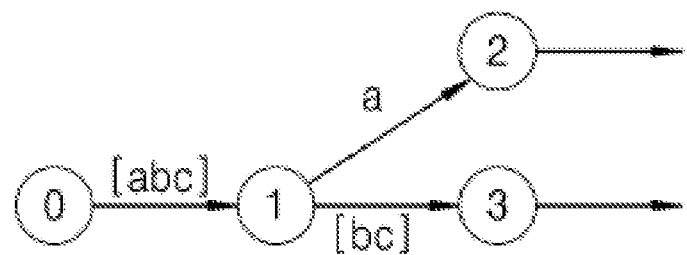
FIGS. 11A, 11B and 11C show examples of a process of constructing a trie from a combined standard type according to an embodiment of the present invention.
Figure 11B:
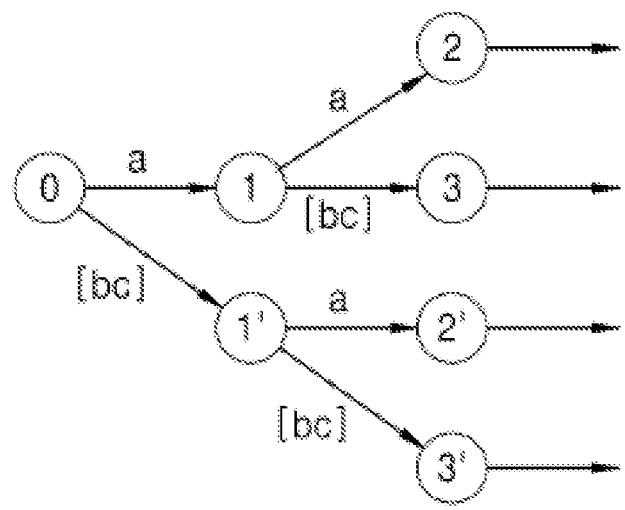
Figure 11C:
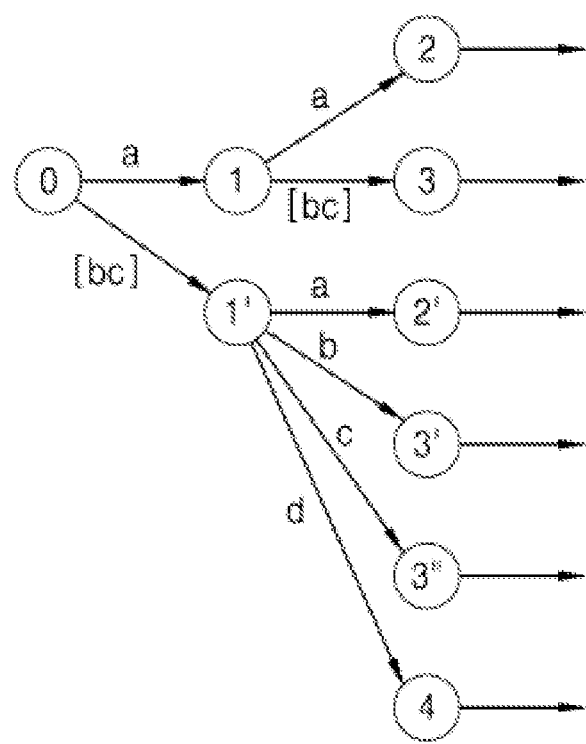

In order to receive the concatenative normal form as input and update the try with the corresponding alternation, not only the addition of the transition but also the duplication of an existing subtree is required. For example, in a state in which a trie as shown in FIG. 11A is constructed, when concatenative normal form /[bc][acd]/ is input, alternation /[bc]/ at the first position is first processed to obtain a trie as shown in FIG. 11B. That is, a subtree with state 1' as a root is created by duplicating a subtree with state 1 as a root, and a set of characters which correspond to the transition from state 0 to state 1 and the transition from state 0 to state 1' are adjusted. This is because the subtree of state 1 is not changed by alternation /[acd]/ that comes after /[bc]/, but the subtree of state 1' can be changed. Then, if alternation /[acd]/ at the second position is processed, a subtree of state 3' is duplicated to a subtree of state 3" and state 4 is added, as shown in FIG. 11C.

The process of generating a trie from a set of concatenative normal forms by the trie generating unit 200 will be generalized and described as below.

The trie generating unit 200 starts from a tie having one root state and sequentially receives and processes concatenative normal forms to generate a final trie. The process of processing one concatenative normal form is a process of updating states and transitions of the trie by applying alternations constituting the concatenative normal form to a previously generated trie.

A process (hereinafter referred to as "process A") of applying the $i^{th}$ alternation (assume that a corresponding set of characters is Li) to state s at the $i^{th}$ depth of the previously generated trie includes a process of performing the following (a1) to (a4) for each transition from state s to the next state.

(a1) Let the corresponding transition ($j^{th}$ transition) be t, the corresponding character set be Cj, and a target state be d.

(a2) When there is no intersection of Li and Cj, no processing is performed for the corresponding transition t.

(a3) If there is the intersection of Li and Cj and Li contains all characters belonging to Cj, and if there is an alternation following the $i^{th}$ alternation, the process A of applying the alternation to state d is recursively performed and the characters belonging to Cj are removed from Li.

(a4) When there is the intersection of Li and Cj and there is a character that belongs only to Cj but is not in Li, characters belonging to Li are excluded from a set of characters which corresponds to transition t (i.e., an alternation to be processed by t, a subtree with state d as a root state is duplicated, and a new transition to the replicated subtree is added to state s according to the intersection of Li and Cj. Then, if there is an alternation following the $i^{th}$ alternation, the process A of applying the alternation to a root state of the replicated subtree is recursively performed, and the characters belonging to Cj are removed from Li.

If a character remains in Li after performing (a1) to (a4) for all transitions of state s, a new transition that goes from state s to a new state and corresponds to Li is added, and if there is an alternation following the $i^{th}$ alternation, process A of applying the alternation to the new state is performed.

The process of generating a trie described above will be described, by way of example, with reference to FIGS. 11A to 11C as follows.

In a state in which a trie as shown in FIG. 11A is constructed, when concatenative normal form /[bc][acd]/ is input, process A of applying alternation /[bc]/ (that is, Li is [bc]) to state 0 begins.

(A1) Transition t is a transition from state 0 to state 1, a corresponding character set Cj is [abc], and its target state is state 1.

(a4) Since there is the intersection of [bc] and [abc] and there is a character "a" that belongs only to [abc] and is not in [bc], characters "b" and "c" that belong to [bc] are excluded from alternation [abc] to be processed by t (therefore, only "a" remains as the alternation to be processed by t), a subtree with state 1 as a root state is duplicated, and a new transition to the duplicated subtree (i.e., to state 1') is added according to the intersection [bc] of [bc] and [abc] (see FIG. 11B). Since there is alternation [acd] following [bc], process A of applying alternation [acd] to root state 1' of the duplicated subtree is recursively performed.

As a result of performing the process A of applying the alternation [acd] to state 1', c is excluded from the alternation [bc] to be processed by the transition from state 1' to state 3', a subtree of state 3' is duplicated to a subtree of state 3", a new transition from state 1' to state 3" is added according to alternation c, and a transition from state 1' to state 4 which corresponds to alternation d is added (see FIG. 11C).

The process of generating a trie from a set of concatenative normal forms is described in a different way as below.

Each state node of a trie is represented by a triple consisting of a transition set T, a matching string information set O, and a failure link target node f, and each transition is represented by a tuple consisting of a character set C and a target state d. Construction of a trie starts with calling BuildTrie with each concatenative normal form as shown below, where root is a starting node of the trie.

let root:= for each *cnf* in generated concatenative normal forms:

root:=BuildTrie(root,*cnf*,0)

Figure 12:
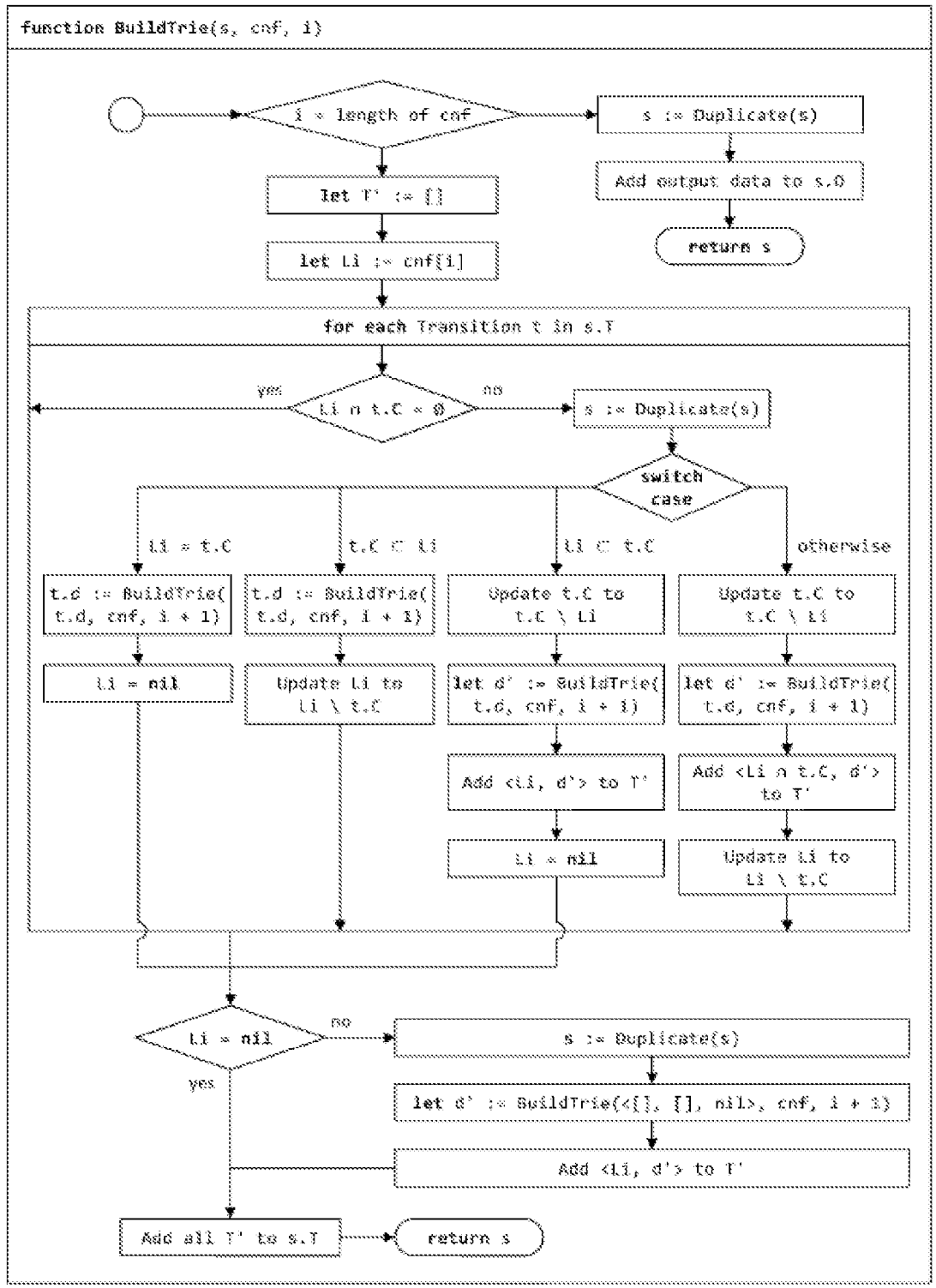

FIGS. 12 and 13 show flowcharts of a BuildTrie function and a Duplicate function for generating a trie from a set of concatenative normal forms, respectively, and FIGS. 14 and 15 show pseudo-codes of the BuildTrie function and the Duplicate function, respectively.

BuildTrie is a procedure for generating a trie, and is recursively called for each position of the concatenative normal form. By comparing the character alternation for each portions of the input concatenative normal form with a character set to be processed by the existing transition, the transition and the state of the transition target are modified or added. Duplicate is a function used to duplicate a subtree. For reference, all the states created during the procedure may be stored, and when a new state is created, the existing state is duplicated, or a state is updated, any stored state that has the same subtree may be reused to build a graph.

A process in which the failure link creating unit 300 generates a failure link for each state of the trie from the trie generating unit 200 will be described in more detail as below.

To assist in understanding the present invention, examples of a process of generating a trie by a general Aho-Corasick algorithm are shown in FIGS. 16A and 16B. In the general Aho-Corasick algorithm in which a transition processes a single character, a new state is not added when a failure link is generated. For example, as shown in FIG. 16A, let a failure link be created up to a state of depth 2, that is, from a root state to a state that can be reached through two transitions. A state without the failure link mans that the failure link is connected to a root state. For example, as shown in FIG. 16B, a failure link of state 3 located at depth 3 is connected to state 4. That is, if there is no transition corresponding to the next character of a document to be searched in state 3, the automaton proceeds to state 4 and the character must be considered again. In the Aho-Corasick algorithm, a failure link of a specific state is connected to the state corresponding to the longest proper suffix of a character string represented by a transition from the root to the current state. Therefore, since the longest proper suffix of character string aab represented by the transition from the root to state 3 is character string b, the target of the failure link of state 3 becomes state 4.

Figure 17A:
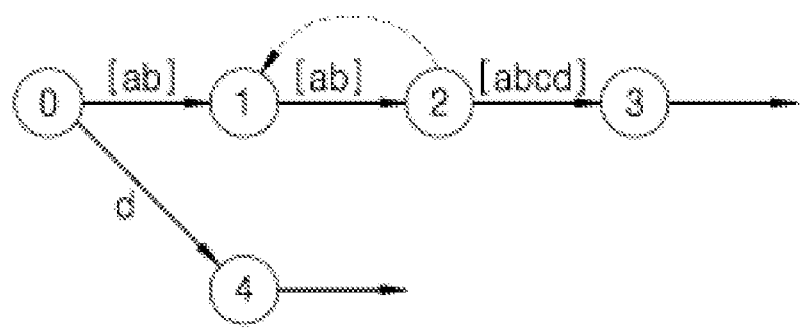
FIGS. 17A and 17B show examples of a process of generating a failure link according to an embodiment of the present invention.
Figure 17B:
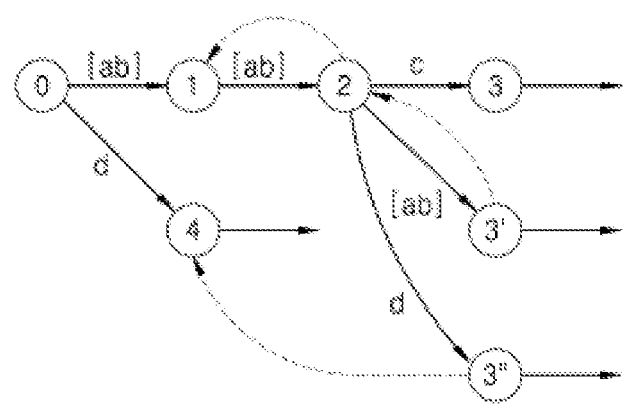

According to an embodiment of the present invention, when a transition processes a set of characters, a subtree may be duplicated when a failure link is created. For example, as shown in FIG. 17A, let a failure link be created up to a state of depth 2. In order to connect the failure link from state 3 located at the next depth, a subtree of state 3 must be duplicated to a subtree of state 3' and a subtree of state 3", as shown in FIG. 17B, and a set of characters to be processed by the transition connected from state 2 must be adjusted. As a result, it can be seen that the failure link is connected to the state corresponding to the longest proper suffix of a concatenative normal form represented by each state. That is, in FIG. 17B, state 3' represents /[ab][ab][ab]/, and thus the failure link is connected to state 2 representing the longest proper suffix /[ab][ab]/, and state 3" represents /[ab][ab][d]/, and hence the failure link is connected to state 4 representing the longest proper suffix /[d]/. Since a proper suffix of state 3 representing /[ab][ab][c]/ does not exist in the trie, the failure link is connected to state 0, which is the root state (but not shown here).

The process of generating the failure link by the failure link creating unit 300 will be generalized and described as below.

A target of a failure link of all states in depth 1 is set to a root state. When a failure link has been created up to a certain depth, a failure link of the next depth may be created. Let a certain state s reach state r through transition t. For failure link connection of state r, a target of a failure link of state s is set to state p, and variable C is initialized to a character set corresponding to transition t, and then (f1) to (f2) (hereinafter referred to as "process F") are performed.

(f1) The following (f11) to (f14) are performed for each transition u from state p to the next state.

(F11) Let a character set corresponding to transition u be B and a state that transition u goes to be q.

(f12) If there is no intersection of B and C, no processing is performed for the corresponding transition u.

(f13) If C and B are the same, or if all characters belonging to C belong to B, a failure link of state r is connected to state q, and C is cleared.

(f14) If characters belonging to both B and C and characters belonging only to C exist, the character set corresponding to transition t (i.e., alternation to be processed by t) is modified to the characters belonging only to C, and, after a subtree of state r is duplicated, a new transition to the duplicated subtree is added to state s according to the intersection of B and C. In addition, a failure link of a root state of the duplicated subtree is added to state q and characters belonging to B are removed from C.

(f2) If there are no characters left in C or state p is the root state, the automaton ends. Otherwise (i.e., if characters remain in C and state p is not the root state), state p is changed to the target state of the failure link of state p, and process F is recursively performed.

The process of creating a failure link described above will be described, by way of example, with reference to FIGS. 17A and 17B.

As shown in FIG. 17A, a process of creating a failure link of depth 3 after completing the creation of a failure link up to depth 2 will be described.

State r to create a failure link is state 3. Then, state s is state 2, transition t is a transition from state 2 to state 3 (corresponding to [abcd]), and state p is state 1. Variable C is initialized to [abcd].

(F1) Transition u from state 1 to the next state is one transition from state 1 to state 2.

(f11) Character set B is [ab], and state q becomes state 2.

(f14) Since characters that belong to both [ab] and [abcd] and characters that belong only to [abcd] exist, alternation [abcd] to be processed by transition t is modified to [cd], and after a subtree of state 3 is duplicated to a subtree of state 3', a new transition to the subtree of state 3' is added to state 2 according to [ab]. In addition, a failure link of root state 3' of the subtree of state 3' is connected to state 2, and [ab] is removed from [abcd], resulting in C becoming [cd].

(f2) Since the characters "c" and "d" remain in C, state p is changed to state 0, which is the target state of the failure link of state 1, and process F is performed again. As a result, as shown in FIG. 17B, the alternation to be processed by transition t is modified to [c], the subtree of state 3 is duplicated to a subtree of state 3", a transition from state 2 to state 3" is added, and the failure link of state 3" is connected to state 4 (see FIG. 17B).

The process of creating a failure link from a trie made with concatenative normal forms is described in a different way as below. To connect the failure link, LinkFailure is called with a root node of a trie, and each state located from depth 1 is processed in order. At this stage, the existing states may also be remembered and the same subtree may be shared for use.

Figure 18:
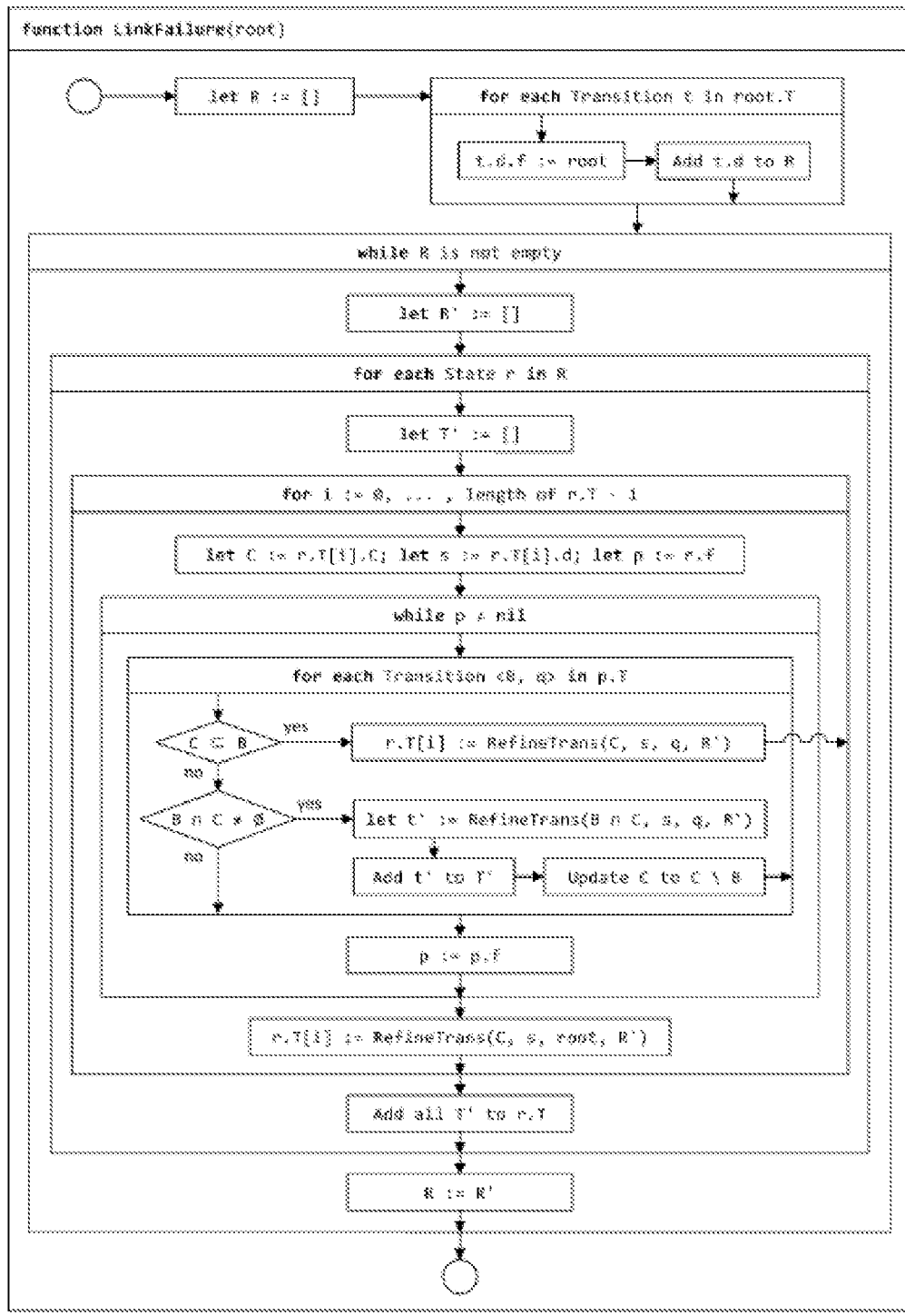
FIGS. 18 and 19 show flowcharts of a LinkFailure function and a RefineTrans function for generating a failure link from a trie, respectively.
Figure 19:
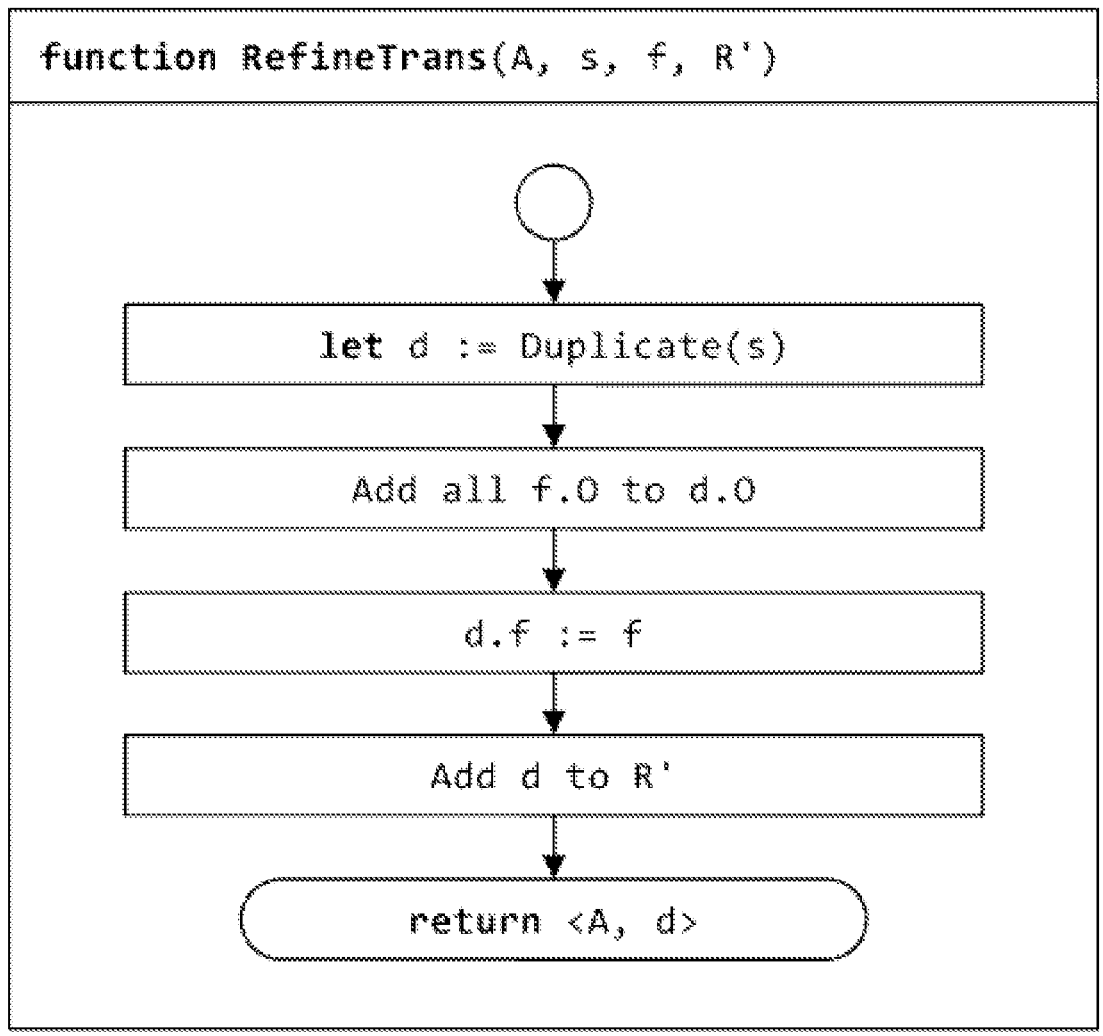
Figures 21, 22:
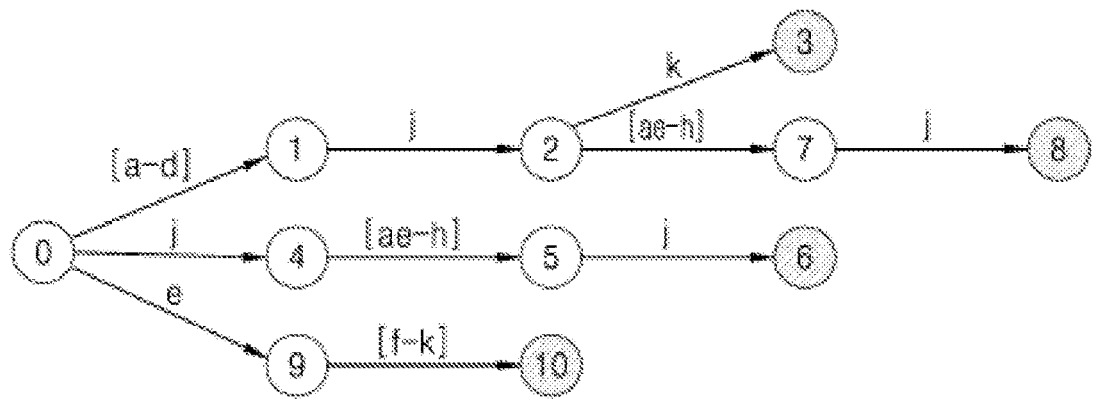

FIGS. 18 and 19 show flowcharts of a LinkFailure function and a RefineTrans function for creating a failure link from a trie, respectively, and FIGS. 20 and 21 show pseudo-codes of the LinkFailure function and the RefineTrans function, respectively.

The Aho-Corasick automata generated according to an embodiment of the present invention dramatically reduce the time and storage space required for automata construction compared to the existing Aho-Corasick automata having a transition that processes only one character, and also can achieve the same character string detection result as the existing Aho-Corasick automata.

In the foregoing description, a relatively simple regular expression is taken as an example. An example of a process of constructing an Aho-Corasick automaton from a relatively complex regular expression according to an embodiment of the present invention will be described below.

For example, let the following regular expression be given.

/[a–d]jk|[a–d]?j[ae–h]j|e[f–k]/

Concatenative normal forms transformed from the above regular expression are as follows:

/[a–d][j][k]/

/[j][ae–h][j]/

/[a-d][j][ae-h][j]/

/[e][f-k]/

Figure 23:
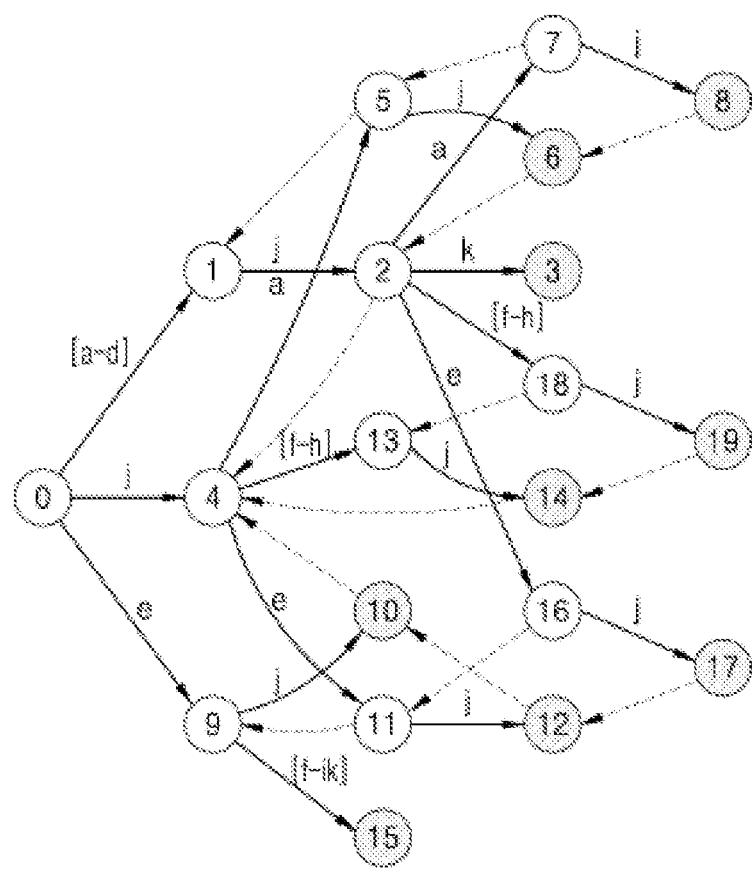
FIG. 23 shows an Aho-Corasick automaton constructed by generating a failure link from the trie of FIG. 22.

FIG. 22 shows a trie generated from the above concatenative normal forms according to an embodiment of the present invention, and FIG. 23 shows an Aho-Corasick automaton constructed by generating failure links from the trie of FIG. 22.

As shown in FIG. 23, it is noted that, despite the complex regular expression, the number of states and the number of transitions are each 20 or less, and thus the Aho-Corasick automata can be constructed in a short time and the storage space is saved.

The present invention provides an apparatus and method for constructing Aho-Corasick automata, which can receive a pattern given as a regular expression, process the pattern in a faster time, and save storage space by reducing the number of transitions. In addition, when a regular expression pattern is searched, it is possible to avoid the complexity of re-adjusting a search range to process overlapping character strings.

Moreover, since the regular expression is transformed into concatenative normal forms and used as input for trie generation, it is possible to reduce the hassle of inputting each character string as input like in the existing Aho-Corasick algorithm. Furthermore, since a transition is processed using each character alternation of the concatenative normal form, it is possible to complete the generation of a trie and creation of a failure link in a short time.

As described above, according to the present invention, it is possible to construct, from a complex regular expression, Aho-Corasick automata capable of efficiently searching for a string of characters.

Exemplary embodiments may also include computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices, and carrier waves (such as data transmission through the Internet).

Embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the embodiments described herein may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus. Moreover, no item or component is essential to the practice of the inventive concept unless the element is specifically described as "essential" or "critical".

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for constructing Aho-Corasick automata, comprising: a concatenative normal form transforming unit configured to receive a regular expression that is expressed using an operator including a concatenation and an alternation and transform the regular expression into concatenative normal forms, wherein each concatenative normal form is defined as a form in which character alternations are connected by concatenation; a trie generating unit configured to generate a trie from the concatenative normal forms by updating states and transitions of the trie, wherein each transition corresponds to a character set, while processing each concatenative normal form in order; and a failure link creating unit configured to create a failure link for each state of the trie by using a character set corresponding to each transition of the trie, wherein a process of processing one concatenative normal form by the trie generating unit is a process of updating the states and transitions of the trie by applying a character alternation constituting the concatenative normal form to a previously generated trie, wherein the process of processing the one concatenative normal form comprises a process hereinafter referred to as a process A of applying an ith alternation let a corresponding character set be Li of the concatenative normal form to states located at an ith depth of the previously generated trie, and in the process A, where a jth transition from the states is t, a character set corresponding to the transition t is Cj, and a target state of the transition t is d, in a case where there is an intersection of the character set Li and the character set Cj and the character set Li includes all characters belonging to the character set Cj, when there is an alternation following the ith alternation, process A of applying the alternation to the state d is recursively performed and characters belonging to the character set Cj are removed from the character set Li.

2. The apparatus of claim 1, wherein when characters remain in the character set Li as a result of removing the characters belonging to the character set Cj from the character set Li, a transition that goes from the state s to a new state and corresponds to the character set Li is added, and when there is the alternation following the $i^{th}$ alternation, process A of applying the alternation to the new state is further performed.

3. An apparatus for constructing Aho-Corasick automata, comprising: a concatenative normal form transforming unit configured to receive a regular expression that is expressed using an operator including a concatenation and an alternation and transform the regular expression into concatenative normal forms, wherein each concatenative normal form is defined as a form in which character alternations are connected by concatenation; a trie generating unit configured to generate a trie from the concatenative normal forms by updating states and transitions of the trie, wherein each transition corresponds to a character set, while processing each concatenative normal form in order; and a failure link creating unit configured to create a failure link for each state of the trie by using a character set corresponding to each transition of the trie, wherein a process of processing one concatenative normal form by the trie generating unit is a process of updating the states and transitions of the trie by applyinc a character alternation constituting the concatenative normal form to a previously generated trie, wherein the process of processing the one concatenative normal form comprises a process hereinafter referred to as a process A of applying an ith alternation let a corresponding character set be Li of the concatenative normal form to state s located at an ith depth of the previously generated trie, and in the process A, where a jth transition from the state s is t, a character set corresponding to the transition t is Cj, and a target state of the transition t is d, in a case where there is an intersection of the character set Li and the character set Cj and there are characters that do not belong to the character set Li but belongs only to the character set Cj, characters belonging to the character set Li are excluded from the character set that corresponds to the transition t, a subtree with the state d as a root state is duplicated, and a new transition to the duplicated subtree is added to the state s according to the intersection of the character sets Li and Cj, and when there is an alternation following the ith alternation, process A of applying the alternation to the root state of the duplicated subtree is recursively performed and characters belonging to the character set Cj are removed from the character set Li.

4. The apparatus of claim 3, wherein when characters remain in the character set Li as a result of removing the characters belonging to the character set Cj from the character set Li, a transition that goes from the state s to a new state and corresponds to the character set Li is added, and when there is the alternation following the $i^{th}$ alternation, process A of applying the alternation to the new state is further performed.

5. An apparatus for constructing Aho-Corasick automata, comprising:
a concatenative normal form transforming unit configured to receive a regular expression that is expressed using an operator including a concatenation and an alternation and transform the regular expression into concatenative normal forms, wherein each concatenative normal form is defined as a form in which character alternations are connected by concatenation;
a trie generating unit configured to generate a trie from the concatenative normal forms by updating states and transitions of the trie, wherein each transition corresponds to a character set, while processing each concatenative normal form in order; and
a failure link creating unit configured to create a failure link for each state of the trie by using a character set corresponding to each transition of the trie,
wherein, when a given state s reaches state r through transition t, a process of connecting a failure link from the state r by the failure link creating unit comprises a process of after setting a target of a failure link of the state s to state p and initializing variable C to a character set that corresponds to the transition t, connecting a failure link of the state r to state q when the variable C and a character set B are the same or all characters belonging to the variable C belong to the character set B, where the character set B corresponds to transition u from the state p to the next state and the state q is a state that the transition u goes.

6. An apparatus for constructing Aho-Corasick automata, comprising: a concatenative normal form transforming unit configured to receive a regular expression that is expressed using an operator including a concatenation and an alternation and transform the regular expression into concatenative normal forms, wherein each concatenative normal form is defined as a form in which character alternations are connected by concatenation; a trie generating unit configured to generate a trie from the concatenative normal forms by updating states and transitions of the trie, wherein each transition corresponds to a character set, while processing each concatenative normal form in order; and a failure link creating unit configured to create a failure link for each state of the trie by using a character set corresponding to each transition of the trie, wherein, when a given states reaches state r through transition t, a process of connecting a failure link from the state r by the failure link creating unit comprises a process of setting a target of a failure link of the states to state p and initializing variable C to a character set that corresponds to the transition t, and a process hereinafter referred to as process F of, when there are characters belonging to both character set B and the variable C and characters belonging only to the variable C, modifying the character set that corresponds to the transition t to the characters belonging only to the variable C, duplicating a subtree of the state r, then adding a new transition to the duplicated subtree to the state s according to an intersection of the character set B and the variable C, connecting a failure link of a root state of the duplicated subtree to state q, and removing characters belonging to the character set B from the variable C, where the character set B corresponds to transition u from state p to the next state and the state q is a state that the transition u goes to.

7. The apparatus of claim 6, wherein in the process F, when characters remain in the variable C as a result of removing the characters belonging to the character set B from the variable C and the state p is not a root state, the state p is changed to a target state of the state p and the process F is recursively performed.

8. A method of constructing Aho-Corasick automata, comprising: receiving a regular expression that is expressed using an operator including a concatenation and an alternation and transforming the regular expression into concatenative normal forms, wherein each concatenative normal form is defined as a form in which character alternations are connected by concatenation; generating a trie from the concatenative normal forms by updating states and transitions of the trie, wherein each transition corresponds to a character set, while processing each concatenative normal form in order; and creating a failure link for each state of the trie by using a character set corresponding to each transition of the trie, wherein in the generating of the trie, a process of processing one concatenative normal form by the trie generating unit is a process of updating the states and transitions of the trie by applying a character alternation constituting the concatenative normal form to a previously generated trie, wherein the process of processing one concatenative normal form comprises a process hereinafter referred to as a process A of applying an ith alternation let a corresponding character set be Li of the concatenative normal form to states located at an ith depth of the previously generated trie, and in the process A, where a jth transition from the states is t, a character set corresponding to the transition t is Cj, and a target state of the transition t is d, in a case where there is an intersection of the character set Li and the character set Cj and the character set Li includes all characters belonging to the character set Cj, when there is an alternation following the ith alternation, process A of applying the alternation to the state d is recursively performed and characters belonging to the character set Cj are removed from the character set Li.

9. The method of claim 8, wherein when characters remain in the character set Li as a result of removing the characters belonging to the character set Cj from the character set Li, a transition that goes from the state s to a new state and corresponds to the character set Li is added, and when there is the alternation following the $i^{th}$ alternation, process A of applying the alternation to the new state is further performed.

10. A method of constructing Aho-Corasick automata, comprising: receiving a regular expression that is expressed using an operator including a concatenation and an alternation and transforming the regular expression into concatenative normal forms, wherein each concatenative normal form is defined as a form in which character alternations are connected by concatenation; generating a trie from the concatenative normal forms by updating states and transitions of the trie, wherein each transition corresponds to a character set, while processing each concatenative normal form in order; and creating a failure link for each state of the trie by using a character set corresponding to each transition of the trie, wherein in the generating of the trie, a process of processing one concatenative normal form by the trie generating unit is a process of updating the states and transitions of the trie by applying a character alternation constituting the concatenative normal form to a previously generated trie, wherein the process of processing the one concatenative normal form comprises a process hereinafter referred to as a process A of applying an ith alternation let a corresponding character set be Li of the concatenative normal form to states located at an ith depth of the previously generated trie, and in the process A, where a jth transition from the states is t, a character set corresponding to the transition t is Cj, and a target state of the transition t is d, in a case where there is an intersection of the character set Li and the character set Cj and there are characters that do not belong to the character set Li but belongs only to the character set Cj, characters belonging to the character set Li are excluded from the character set that corresponds to the transition t, a subtree with the state d as a root state is duplicated, and a new transition to the duplicated subtree is added to the state s according to the intersection of the character sets Li and Cj, and when there is an alternation following the ith alternation, process A of applying the alternation to the root state of the duplicated subtree is recursively performed and characters belonging to the character set Cj are removed from the character set Li.

11. The method of claim 10, wherein, when characters remain in the character set Li as a result of removing the characters belonging to the character set Cj from the character set Li, a transition that goes from the state s to a new state and corresponds to the character set Li is added, and when there is the alternation following the $i^{th}$ alternation, process A of applying the alternation to the new state is further performed.

12. A method of constructing Aho-Corasick automata, comprising:
receiving a regular expression that is expressed using an operator including a concatenation and an alternation and transforming the regular expression into concatenative normal forms, wherein each concatenative normal form is defined as a form in which character alternations are connected by concatenation;
generating a trie from the concatenative normal forms by updating states and transitions of the trie, wherein each transition corresponds to a character set, while processing each concatenative normal form in order; and
creating a failure link for each state of the trie by using a character set corresponding to each transition of the trie,
wherein, when a given state s reaches state r through transition t, in the creating of the failure link, a process of connecting a failure link from the state r comprises a process of after setting a target of a failure link of the state s to state p and initializing variable C to a character set that corresponds to the transition t, connecting a failure link of the state r to state q when the variable C and a character set B are the same or all characters belonging to the variable C belong to the character set B, where the character set B corresponds to transition u from the state p to the next state and the state q is a state that the transition u goes.

13. A method of constructing Aho-Corasick automata, comprising: receiving a regular expression that is expressed using an operator including a concatenation and an alternation and transforming the regular expression into concatenative normal forms, wherein each concatenative normal form is defined as a form in which character alternations are connected by concatenation; generating a trie from the concatenative normal forms by updating states and transitions of the trie, wherein each transition corresponds to a character set, while processing each concatenative normal form in order; and creating a failure link for each state of the trie by using a character set corresponding to each transition of the trie, wherein, when a given states reaches state r through transition t, in the creating of the failure link, a process of connecting a failure link from the state r comprises a process of setting a target of a failure link of the states to state p and initializing variable C to a character set that corresponds to the transition t; and a process hereinafter referred to as process F of, when there are characters belonging to both character set B and the variable C and characters belonging only to the variable C, modifying the character set that corresponds to the transition t to the characters belonging only to the variable C, duplicating a subtree of the state r, then adding a new transition to the duplicated subtree to the states according to an intersection of the character set B and the variable C, connecting a failure link of a root state of the duplicated subtree to state q, and removing characters belonging to the character set B from the variable C, where the character set B corresponds to transition u from state p to the next state and the state q is a state that the transition u goes to.

14. The method of claim 13, wherein in the process F, when characters remain in the variable C as a result of removing the characters belonging to the character set B from the variable C and the state p is not a root state, the state p is changed to a target state of the state p and the process F is recursively performed.

\* \* \* \* \*